United States Patent [19]

Behr

[11] Patent Number: 4,515,647
[45] Date of Patent: May 7, 1985

[54] METHOD AND APPARATUS FOR FORMING AN INTEGRAL CLOSURE FOR A THERMOPLASTIC CONTAINER

[75] Inventor: Raymond D. Behr, Midland, Mich.

[73] Assignee: The Dow Chemical Company, Midland, Mich.

[21] Appl. No.: 586,163

[22] Filed: Mar. 5, 1984

Related U.S. Application Data

[63] Continuation-in-part of Ser. No. 464,828, Feb. 8, 1983, abandoned, which is a continuation of Ser. No. 255,007, Apr. 17, 1981, abandoned.

[51] Int. Cl.³ .............................................. B32B 7/04
[52] U.S. Cl. ................... 156/91; 156/244.11; 156/244.25; 156/500; 264/167; 264/171; 264/176 R; 425/131.1; 425/133.5; 24/572
[58] Field of Search ............... 156/91, 244.11, 244.25, 156/500; 264/167, 171, 176 R; 24/201 C; 425/114, 131.1, 133.5, 382 R, 462, 463, 464, 465

[56] References Cited

U.S. PATENT DOCUMENTS

| | | | |
|---|---|---|---|
| 3,460,337 | 8/1969 | Feild | 264/167 |
| 3,462,332 | 8/1969 | Gots | 264/167 |
| 3,619,395 | 11/1971 | Skendzic | 264/171 |
| 3,945,872 | 3/1976 | Noguchi | 156/244.25 |
| 4,118,166 | 10/1978 | Bartrum | 425/133.5 |
| 4,263,079 | 4/1981 | Sutrina et al. | 156/244.25 |

FOREIGN PATENT DOCUMENTS 2046660 11/1980 United Kingdom .

*Primary Examiner*—Caleb Weston
*Attorney, Agent, or Firm*—Lloyd E. Hessenaur, Jr.; Thomas J. Mielke

[57] ABSTRACT

An improved high speed cast process and apparatus for fusing fasteners, with enlarged bases, to separately extruded film or sheet stock, for forming into containers with integral closure means. The invention utilizes joining of the fasteners, bases and film or sheet stock within the extrusion die to insure secure joining thereof with relative ease.

5 Claims, 5 Drawing Figures

METHOD AND APPARATUS FOR FORMING AN INTEGRAL CLOSURE FOR A THERMOPLASTIC CONTAINER

CROSS-REFERENCE TO RELATED APPLICATION

The present application is a continuation-in-part of copending application Ser. No. 464,828 filed Feb. 8, 1983, abandoned, which is a continuation of application Ser. No. 255,007 filed Apr. 17, 1981, abandoned.

BACKGROUND OF THE INVENTION

This invention relates to a high-speed cast process and apparatus for making an improved film or sheet product with integral fastening elements. More particularly, this invention relates to a method and apparatus for in-line fusing of closure profiles, including any base portions, with a layer of film or sheet, the film or sheet with the closure profiles being converted into containers such as bags.

One such process is that described in U.S. Pat. No. 4,263,079 ('079) issued Apr. 21, 1981, and assigned to the same assignee as is the present invention. In that invention the fastener elements are extruded separately and joined to the mainstream film body or sheet very closely to the location where the film or sheet exits from the die lips so that the joining occurs before significant cooling of the extrudate.

The process taught by the '079 reference results in the introduction of lateral stress in the mainstream film body. Those skilled in the art will appreciate that this lateral stress results from the longitudinal stretching and concurrent restriction of the lateral edges of the mainstream film body. The process taught by the '079 reference results in thinning of the mainstream film body immediately adjacent to the separately extruded fastening elements. This thinning is a manifestation of the lateral stress present in the mainstream film body.

Attempts to compensate for this thinning by tapering the edges of the base of the closure profiles have proven unsatisfactory. This is because the tapered edges tend to curl up rather than adhere to the mainstream film layer.

SUMMARY OF THE INVENTION

The present invention is an improvement insuring secure adhesion with even greater ease between the fastener elements, including any base portions, and the film. This is accomplished by joining of the fastener elements with the layer of film inside the die, i.e., at a point before the end of the die lips. While the present improvement invention does not have the flexibility of adjusting the profile extrusion position with respect to the mainstream film extrusion as is the case with the invention of U.S. Pat. No. 4,263,079, for those situations where this flexibility is not required the present invention provides the advantage of obtaining secure adhesion with relative ease between the fastener elements, including any base portions, and the film.

As in the process taught by the '079 reference, the process claimed in the present invention results in the introduction of lateral stress in the mainstream film body. Due to the improved adhesion of the present invention, the edges of the base of the closure profile can be tapered to compensate for lateral stress induced thinning of the film immediately adjacent to the fastening element.

The invention resides in a system for forming a mainstream film or sheet with an integral fastener wherein the film die lip is recessed to take a die plate adjacent thereto, the plate being slotted in the configuration of a closure profile in open communication with the mainstream film extrusion channel so that the extrudate forming the closure profile is forced to merge with the film extrudate prior to exiting of the film extrudate from the die lips of the film die. The mainstream film or sheet has a width several times greater than the closure profile. The closure profile is preferably fed from a secondary source angularly disposed towards the mainstream film to enhance joining of the film and closure profile before the same exit the extrusion die lips.

DETAILED DESCRIPTION OF THE DRAWINGS

Figure 1:
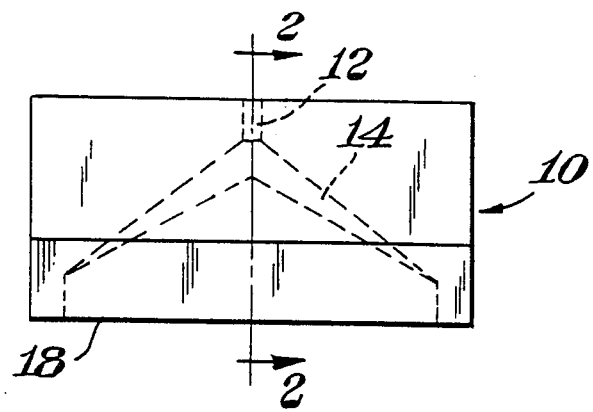
FIG. 1 is a schematic plan view showing an extrusion apparatus for integrally forming fastening elements on a layer of film or sheet.
Figure 2:
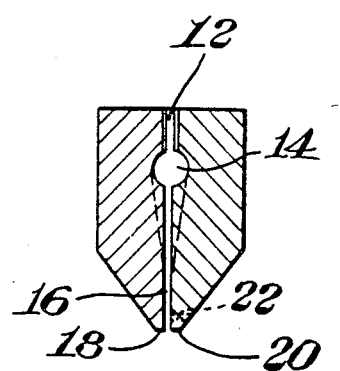
FIG. 2 is a cross-sectional view of the extrusion apparatus of FIG. 1, taken along reference line 2—2 thereof.
Figure 3:
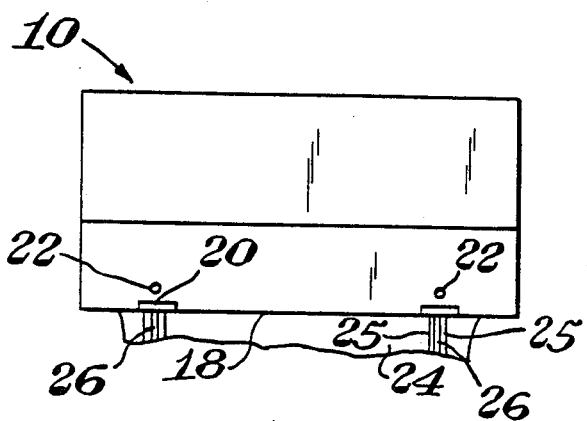
FIG. 3 is a rear view of the apparatus of FIG. 1 looking towards the right side of FIG. 2 and illustrating the die plate inserts for forming the fastening elements, with the film and fastening elements shown exiting from the die.

Referring more particularly to FIGS. 1 to 3, a typical thermoplastic extrusion die 10 of the so-called "coat hanger" type is illustrated with an extrusion cavity including a manifold 14 and a slot 16 so that the thermoplastic material entering through the cavity 12 thins and spreads as it proceeds down the length of the die through manifold 14 and slot 16 to die lips 18 at the exiting end of the die. A section of each die at its die lips 18 is recessed or cut away so as to receive a die plate or plates 20 as illustrated in FIG. 3. Die 10 has an integral feed channel 22 for feeding resin to each die plate 20. However, while not shown, it is also feasible to feed resin to die plate 20 from the main cavity 12. By having a separate channel 22, as shown, for feeding thermoplastic material to die plate 20, the composition of the resin, or its color or other characteristics can be modified as desired without having to change the main resin for the film being extruded through cavity 12 and die lips 18. A mainstream film 24 containing integral closure profiles 26 exiting from die lips 18 is illustrated in FIG. 3. As is evident from FIG. 3, the mainstream of film 24 is several times wider than profile 26.

Figure 4:
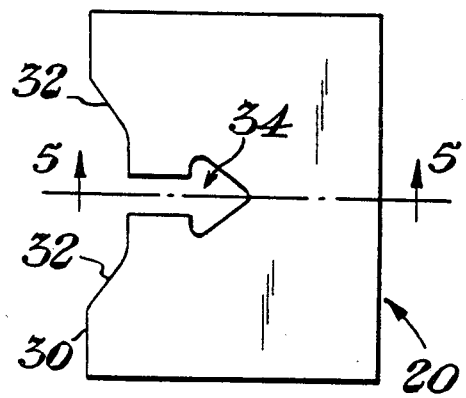
FIG. 4 is a greatly enlarged plan view of one of the die inserts of FIG. 3.
Figure 5:
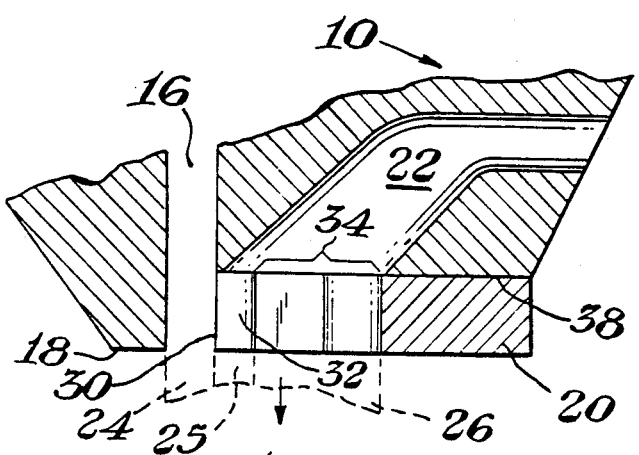
FIG. 5 is a cross-sectional view of the die plate of FIG. 4 and a section of the die immediately thereabove with film and a fastening element exiting therefrom as shown in dotted lines.

A greatly enlarged view of die plate 20 is shown in FIG. 4. The edge 30 of die plate 20 facing extrusion slot 16 is cut away at 32 in the shape of a profile base and at 34 in the configuration of a male fastening element, respectively. Die plate 20 can be secured to a recessed or cut-away section 38 of die lips 18 of die 10. Resin for the fastening elements extruded through cut-away sections or openings 32 and 34 is fed into cavity 22 from an extrusion source not shown, which resin proceeds through the cavity 22 and the cut-away sections 32 and 34 to join with the resin of the film 24 to provide a product having a main body or film 24, preferably with a thickening strip or profile base 25 (formed at cut-away 32), and a closure profile or fastening element 26 located thereon and integrally forming a part thereof. Because the fastener elements, and base if employed, are joined in their molten condition to the film resin, the fastener elements and film are joined together and extruded in the form of a layer of film or sheet containing an integral closure or fastening element located thereon. The travel of film 24 with its closure profile 26 after the same exit die lips 18 can be cooled and taken away generally as shown in FIG. 1 of the U.S. Pat. No. 4,263,079 for further processing at container-forming stations not shown. The product made by the process of this application is essentially the same as that made in the aforesaid U.S. Pat. No. 4,263,079, this present invention only serving to assure that joining of the fastener elements with the film in a high speed process is accomplished with a high degree of reliability. In respect to the materials, systems, apparatus and other aspects of the present invention common with those in U.S. Pat. No. 4,263,079, that patent is hereby incorporated by reference.

As can be appreciated by the above description, adhesion is readily obtained with the present invention because the significantly narrower closure profile and its base are joined to the mainstream of film within the die so that the die, its die lips and the die plate functioned as an enclosure defining a confining area for keeping the closure profile, profile base and the film layer together while in an adhesive state. This enclosure or encapsulation of the total flow can particularly be an advantage when the bases of the closure profiles taper at their edges or side extremities. Otherwise, as in the process taught by the '079 reference, such edges tend to curl up rather than adhere to the film layer. Tapering at the edges of the closure profile base is desirable to compensate for the thinning of the mainstream film immediately adjacent to the closure profile. Said thinning being caused by lateral stress within the mainstream film body.

While certain representative embodiments and details have been shown for purposes of illustrating the invention, it will be apparent to those skilled in the art that various changes in applications can be made therein without departing from the spirit and scope of the invention. For example, the mainstream extrudate can be film or sheet, can be made of different materials from that of the fastener elements, the profile fastener elements can be made of various synthetic materials, the size, color and shape of the components can be varied and the number of fastening elements extruded onto a film or sheet can vary.

What is claimed is:

1. A method for forming an integral thermoplastic fastener element on a mainstream thermoplastic film or sheet extruded from a cast die having die lips at its exit, said method comprising the steps of extruding said film or sheet through said die lips, extruding at least one fastening element and a profile base in said die in open communication with said film and sheet, and width of said mainstream of thermoplastic film or sheet being several times wider than said fastener element, whereby said profile base with said fastener element is joined with said film or sheet before the same leaves the die lips, and cooling said joined film or sheet and fastener element outside the die lips.

2. The method of claim 1 wherein the extrusion of said fastening element within said die is angularly disposed towards said film or sheet to enhance said joining.

3. The method of claim 1 wherein the edges of the profile base are tapered to compensate for thinning of the mainstream film or sheet adjacent to the profile base.

4. An apparatus for forming an integral thermoplastic fastening element on a mainstream thermoplastic film or sheet, said apparatus including a forming die having die lips at its exit, a slot in said die for feeding resin to said die lips for forming said film or sheet, a recess in said die adjacent one of the die lips, a die plate located in said recess, said die plate including an opening in the shape of a profile base with a fastening element, said film or sheet die slot being several times wider than said die plate opening, means for feeding resin to said opening, the edge of the die plate where such opening occurs facing the feed slot for the film or sheet upon which the fastening element is extruded and joined, the shape of the die plate opening configured to confine the profile base between said fastener element and the feed slot, said die plate and the die lip facing the die plate forming together an confining area for the resin extruding through the die plate and through the feed slot of the die whereby the profile base with the fastener element is directly adhered to the film or sheet.

5. The apparatus of claim 4 wherein the edges of the profile base are tapered to compensate for thinning of the mainstream film or sheet adjacent to the profile base.

* * * * *